United States Patent [19]

Rohr

[11] 4,332,271
[45] Jun. 1, 1982

[54] THROTTLING DEVICE FOR PIPE CONDUITS

[75] Inventor: Eduard Rohr, Maegenwil, Switzerland

[73] Assignee: Eduard Rohr AG, Maegenwil, Switzerland

[21] Appl. No.: 172,989

[22] Filed: Jul. 28, 1980

[30] Foreign Application Priority Data

Aug. 8, 1979 [CH] Switzerland .......................... 7266/79

[51] Int. Cl.³ ........................ F16K 51/00; F16L 55/10
[52] U.S. Cl. ................................... 137/315; 251/146; 251/148; 251/305; 251/286
[58] Field of Search ..................... 137/315, 464.2, 237, 137/238; 251/145, 146, 148, 305, 306, 286

[56] References Cited

U.S. PATENT DOCUMENTS

| | | | |
|---|---|---|---|
| 1,302,891 | 5/1919 | Balthasar | 251/305 |
| 2,693,975 | 11/1954 | Smith | 285/199 |
| 3,058,483 | 10/1962 | Douglass et al. | 137/315 |
| 3,424,430 | 1/1969 | Hoelsch | 251/148 |
| 3,436,166 | 4/1969 | Erickson | 251/145 |
| 3,520,333 | 7/1979 | De Young, Jr. et al. | 251/146 |
| 3,860,038 | 1/1975 | Forni | 138/94.3 |
| 3,981,482 | 9/1976 | Callahan, Jr. et al. | 251/148 |
| 4,079,746 | 3/1978 | Killian | 137/315 |

Primary Examiner—George L. Walton
Attorney, Agent, or Firm—W. G. Fasse; D. F. Gould

[57] ABSTRACT

A throttling device is located in a venting pipe or in a pipe section such as a flue gas pipe or conduit arranged between a boiler and a flue or chimney. The flap is held in a pipe section for removal out of the respective pipe either by tilting or by pulling the flap out. For this purpose the pipe section has a slot which is about semi-circular and which, in operation, is covered by a ring section or sector. The throttle flap may be pulled out of the pipe section together with the ring section and with its adjustment drive whereby cleaning of the pipe or conduit is substantially facilitated. Heat losses through the flue are avoided when the throttle flap is closed.

10 Claims, 9 Drawing Figures

4,332,271

THROTTLING DEVICE FOR PIPE CONDUITS

BACKGROUND OF THE INVENTION

The invention relates to a throttling device for conduits, such as pipe conduits. In particular the invention relates to a pipe section including a flap valve rotatable by an adjustable drive. The pipe section and flap may be inserted in the flue between a furnace or boiler exit and a chimney.

Throttling devices provided with flap means have been known for a long time. These devices, however, have a drawback since the cleaning of the respective pipe sections of soot or dirt is substantially encumbered, because the passage of brushes or other cleaning means is obstructed.

OBJECTS OF THE INVENTION

In view of the foregoing it is the aim of the invention to achieve the following objects singly or in combination:

to produce a throttling device in which the valve or flap may be easily removed for the purpose of thorough cleaning or maintenance of the respective pipe section;

to construct the throttling device so that maintaining a good seal and a simple structure are assured;

to make the flap or valve removable from the pipe section either by a tilting movement or by a withdrawal movement;

to avoid any fine adjustment other than the normal positioning adjustment of the flap angle relative to the longitudinal axis of the pipe section; and to make sure that the ignition of the furnace can take place only when the flap valve means has reached its fully open position.

SUMMARY OF THE INVENTION

The throttling device according to the invention comprises a substantially semicircular slot in the pipe, pipe section or conduit. The slot is covered by a ring section preferably made of metal. The flap or valve member is operatively secured to the ring section for positional adjustment. The flap extends through the slot into the pipe or conduit. The ring section is secured to the pipe or conduit by releasable means so that the ring section and with it the flap may be removed out of or tilted out of the pipe or conduit when the flap or valve member is in its pipe or conduit closing position. The pipe or conduit may be of circular, square, or rectangular or any other suitable cross-section.

Due to these features, the valve or flap may easily be pulled out of the pipe section by hand for a cleaning or the like. This removal or tilting out of the way allows an easy unobstructed access for cleaning brushes to the entire pipe diameter or for other cleaning means and for inspection or maintenance work in the pipe section. The assembly or mounting is just as simple and does not require any adjustment other than the positioning of the flap.

BRIEF FIGURE DESCRIPTION

In order that the invention may be clearly understood, it will now be described, by way of an example of a flue gas throttling device, with reference to the accompanying drawings, wherein.

DETAILED DESCRIPTION OF PREFERRED EXAMPLE EMBODIMENTS AND THE BEST MODE OF THE INVENTION

Figure 1:
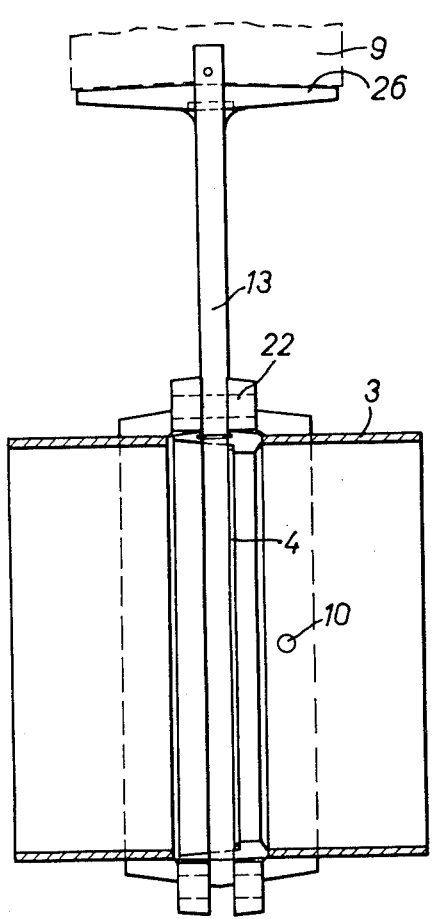
FIG. 1 shows a longitudinal section through a throttling device according to the invention.
Figure 2:
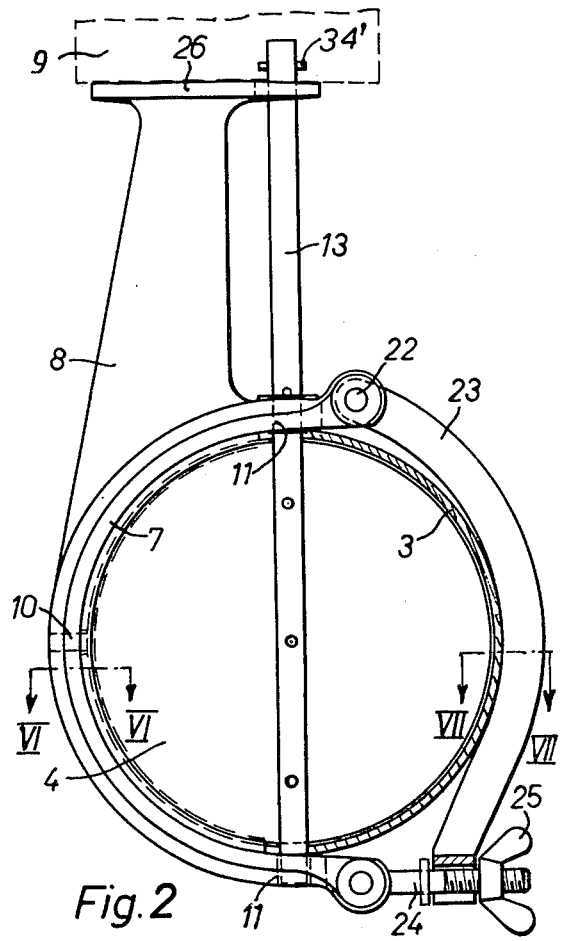
FIG. 2 is a side view partially in section, of the throttling device according to FIG. 1.
Figure 3:
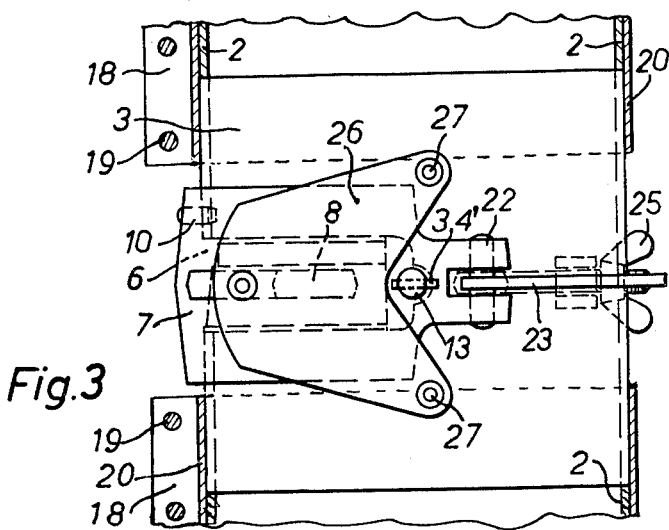
FIG. 3 is a top view of the throttling device according to FIGS. 1 and 2.

The throttling device according to FIGS. 1 to 3 is inserted, for example, in a previously made cut-out in a pipe section 3 of the flue gas conduit 2 between a furnace and a chimney.

The purpose of the throttle flap 4 is to prevent the cooling of the specific heat of the furnace or the boiler, when the oil burner is shut off. The heat present in the furnace or the boiler is thus stored and the cooling down due to the otherwise unavoidable chimney or flue draft is effectively prevented. Before the oil burner is switched on, the throttle valve or flap is opened, so that the exhaust gases may pass freely through the open throttle. The burner may be turned on only after the valve has actually reached its open position. This operation is assured by an electrical monitoring device, not shown.

To prevent the throttling device from obstructing the cleaning of the respective pipe section, the valve may be removed from the pipe section so that cleaning brushes, or the like, may have unhindered access to the entire pipe diameter.

This temporary removal of the valve flap 4 is made possible by a slot 6 in a metal pipe section 3 inserted in an opening in the flue gas pipe conduit 2. The pipe section 3 has, for example, a circular cross section, and is clamped at both ends by means of a sleeve 20 or a pipe clamp, to the conduit 2, which conducts the flue gas.

The approximately semicircular, lateral, substantially radially extending slot 6 in the pipe section 3 is covered by a curved annular section or ring member 7. A hinge 22 is located at the upper end of the annular section or ring member 7 which serves as a pivoting connection for an arched bail 23. The lower end of the annular section or ring member 7 carries a tiltably supported, threaded bolt 24 which engages into a slot in the lower end of bail 23. The bolt 24 may be secured or tightened by means of a wing nut 25. Two boreholes in the upper and lower ends of the annular section member 7 act as bearings through which a rod 13 extends. The rod 13 is fastened to the middle of a valve flap 4 which is located in the interior of pipe section 3. The valve or flap 4 may take up the closed position shown in FIG. 2 or it may be rotated by 90° to assume the open position.

The pipe section 3 is fastened at both ends to the conduit 2 by means of sleeves 20. Each of these two sleeves 20 is situated so that one half of its width covers the pipe section 3 and the other half covers the conduit 2. The conduit 2 and the pipe section 3 have the same or approximately the same outer diameter. As shown in FIG. 3, the sleeves 20 are made of a flexible material and are provided with radially extending flanges 18 which can be drawn together by means of screws 19 to produce a practically tight connection which is fixed against displacement.

The rod 13 projects out above the annular section member or ring section 7 and is connected to an adjustment drive motor 9 which is secured to the annular section member or ring section 7 by means of an arm 8 so that both the ring section 7 and the adjustment drive 9 may be removed from the pipe member or section 3 simultaneously or together. The arm 8 is rigidly secured to the ring section 7 or the arm may form an integral part of the ring section 7.

The adjustment drive 9 is of a known construction and comprises within its cup shaped housing an electric drive motor and reduction gear means as well as a limit switch for switching off the motor in both end positions of the valve or flap 4. Furthermore, a switch is provided, which is connected to the oil burner. This further switch is closed only when the valve flap 4 has taken up the open position. The flap position adjustment drive 9 is secured to the arm 8 by screws which pass through boreholes 27 in a plate 26 located at the upper end of the arm 8. A pin 34' at the upper end of the rod 13 cooperates with a clutch of the adjustment drive 9. This clutch is made to yield elastically to torque loads by means of a spring so that an overload of the adjustment motor in the closed position of the valve flap 4 is prevented.

Figure 6:
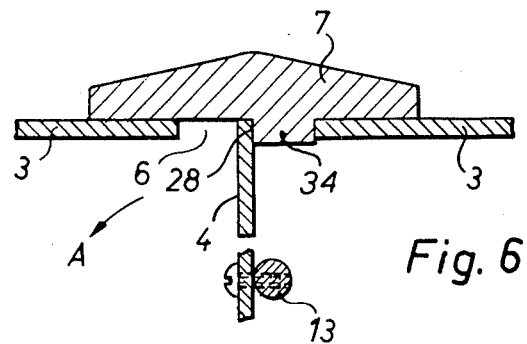
FIG. 6 is a section along the line VI—VI in FIG. 2.
Figure 7:
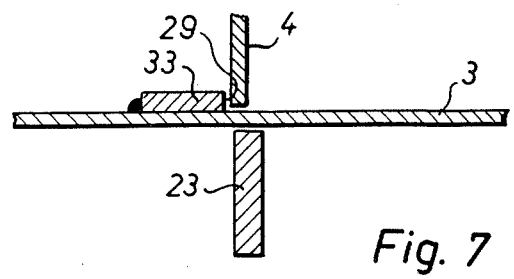
FIG. 7 is a section along the line VII—VII in FIG. 2.

As shown in FIGS. 6 and 7, the valve flap 4 butts against an approximately semi-circular, radial shoulder 28 of the annular section member or ring section 7 in it closed position. The shoulder 28 is formed by an inwardly protruding, approximately semi-circular projection 34 of the annular section member or ring section 7. The slot 6 is made so wide as to allow the valve or flap 4 to be swivelled freely in the direction of arrow A, shown in FIG. 7, into the open position. The flap 4 rests against a shoulder 29 of an approximately semi-circular stop piece 33 located against the inner wall of the pipe opposite to the slot 6. The shoulder 28 may be machined. Besides, the pipe section 3 is quite stiff since the thickness of the pipe wall is chosen to be at least 2 mm.

Thus, it is possible to make a good seal against escape of the exhaust gases and thereby against any loss of heat without impeding the ease of motion of the flap 4 and without the need for close tolerances. The exact position of the components relative to one another is achieved in the assembly by at least one centering means such as a centering pin 10.

Figure 4:
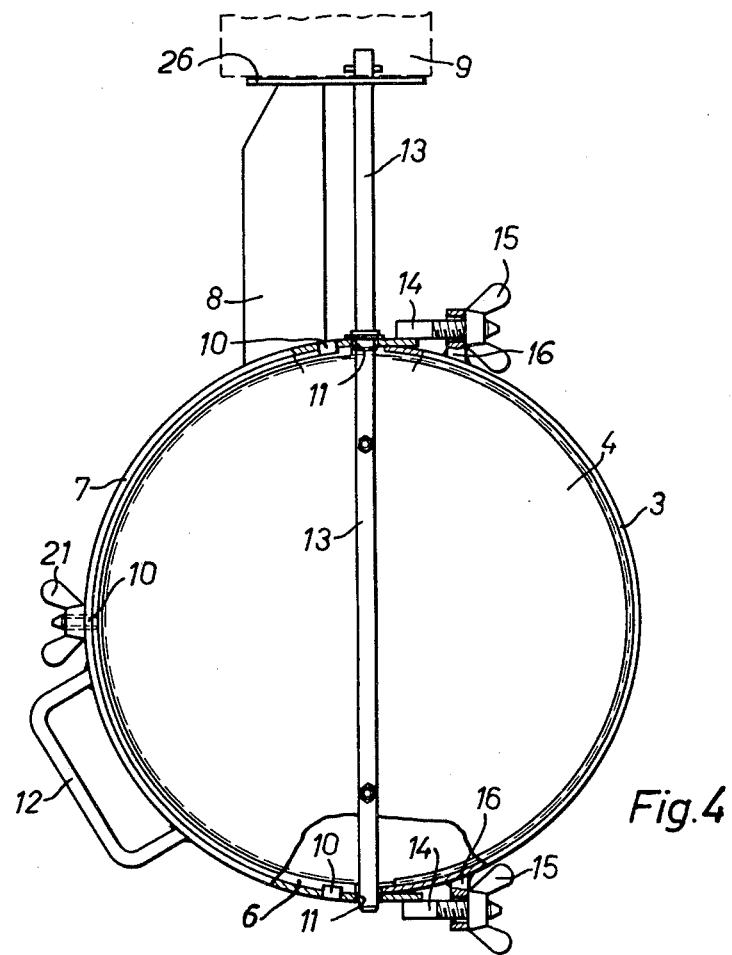
FIG. 4 shows a cross-section through a throttling device for relatively large pipe diameters.
Figure 5:
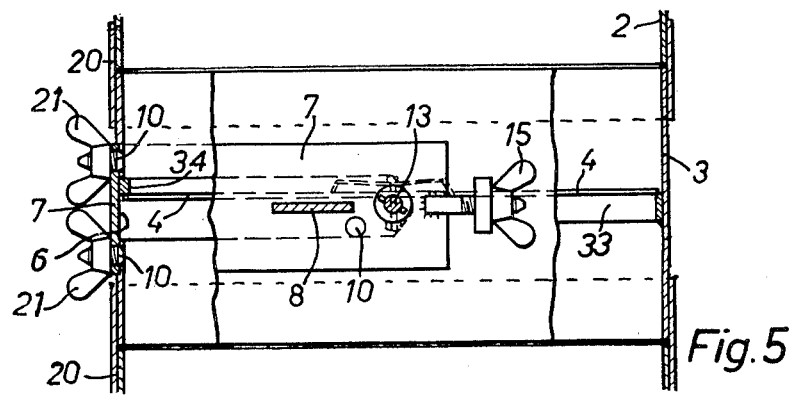
FIG. 5 is a top view of the throttling device according to FIG. 4.

FIGS. 4 and 5 show an embodiment of the invention for relatively large pipe diameters. The assembly and mode of operation are the same as in the embodiment according to FIGS. 1 to 3 and the same reference numerals refer to the same parts.

A tangentially projecting threaded tension bolt 14 is rigidly secured to each end of the annular section member or ring section 7. These tension bolts 14 pass through eyelets 16 which are welded to the pipe section 3. The arched annular section or ring section 7 may be fastened to the pipe section 3 by means of wing nuts 15, or the like so that the slot 6 may be tightly sealed. The centering pins 10 are provided with outer threading onto which wing nuts 21 are screwed. A handle 12 facilitates the manipulation of the annular section member or ring section 7.

When the flue is to be cleaned, it is sufficient in both embodiments, to loosen the respective wing nuts 15, 21 and 25 according to FIGS. 1 to 3 as well as 4 and 5, whereupon the annular section member 7 and the valve flap 4, in its closed position, may be pulled out perpendicularly to the pipe's longitudinal axis. Hence, the entire pipe cross-section of the flue pipe or conduit is free to be cleaned and brushes, or other similar cleaning means may pass through the full cross-section without any impediments.

Figure 8:
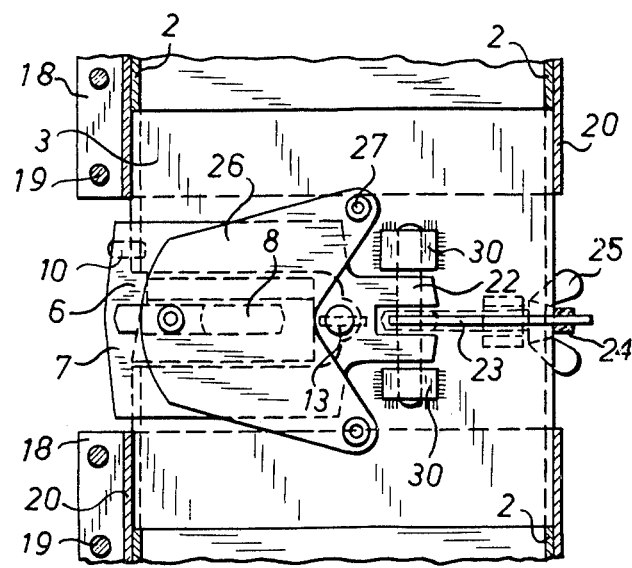
FIG. 8 shows a top view analogous to FIG. 3, however provided with bearing or hinging means for the swiveling of the throttle valve together with the annular member or ring section.

FIG. 8 shows a modified embodiment in which it is possible to rotate the flap 4 along with the annular section member 7 about an axis of rotation defined by the hinges or bearing members 30. This axis extends preferably in parallel to the pipe's longitudinal axis. Thus, in FIG. 8, it is not necessary to pull out the device in a straight line perpendicular to the longitudinal axis. As shown in FIG. 8, the hinges or bearings 30 are welded to the pipe section 3. The pin 22 extends parallel to the longitudinal pipe axis and is located at one end of the annular section member 7. The bail 23 is hinged by the same hinge pin 22 to the same end of the ring section 7. This hinge pin 22 is long enough to pass through both hinges 30. By these means, the annular section member or ring section 7 along with the flap 4 and the adjustment drive 9 may be swivelled out of the slot 6 about the hinge pin 22, which acts as an axis of rotation, after the fastening means 24, 25 haven been loosened. The hinge pin 22 is somewhat spaced radially away from the pipe section 3.

This throttling device may be used for flue gas pipes as well as for ventilation pipes or conduits.

Figure 9:
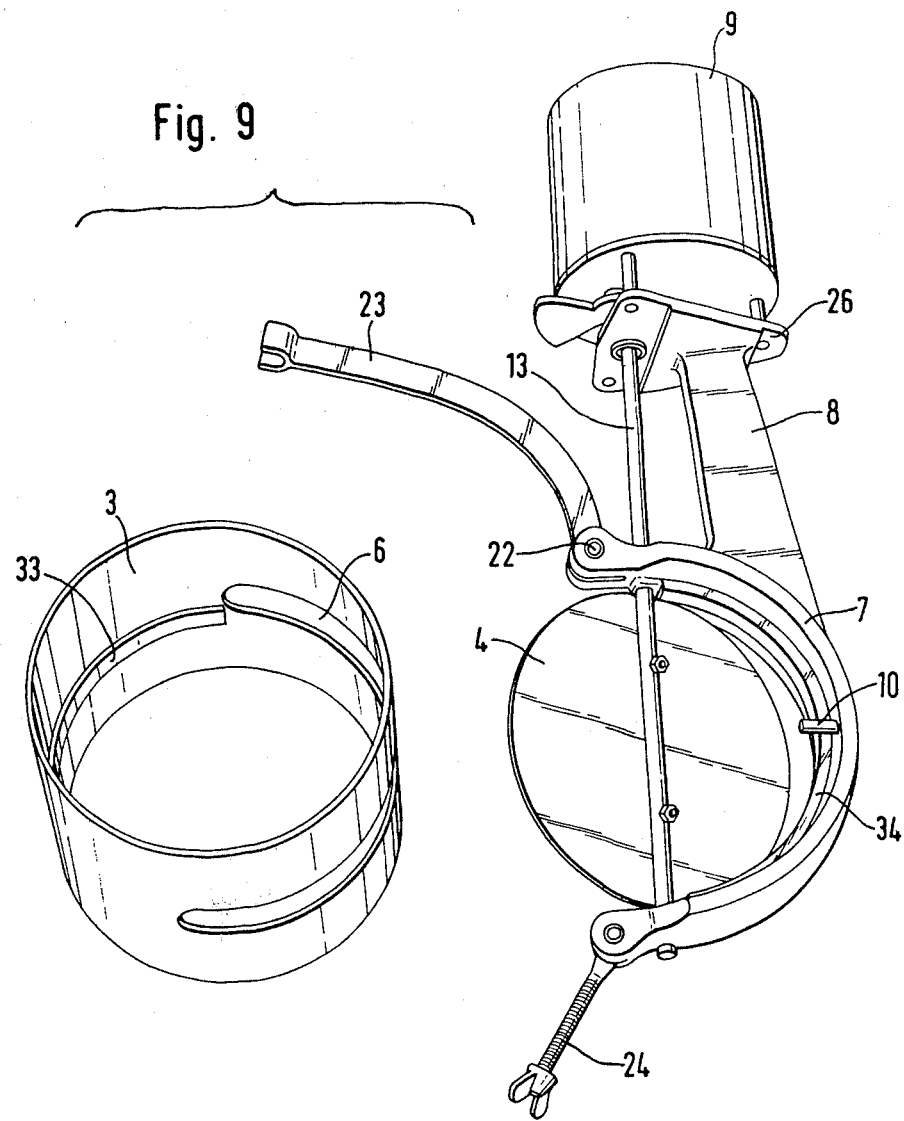
FIG. 9 is a perspective exploded view of the parts of an embodiment of the invention.

FIG. 9 shows how the pipe section 3 is slotted by the substantially semi-circular slot 6 on one side. The substantially semi-circular shoulder forming stop piece 33 is located about diametrically opposite the slot 6. The substantially semi-circular ring section 7 holds the adjustment rod 13 which in turn has secured thereto the flap 4. The rod 13 extends across the flap 4 but not necessarily across the flap center. Eyelets are located to each end of the section 7. One eyelet holds the hinge pin 22 and the bail 23. The other eyelet also holds a hinge pin and a threaded bolt 24 which, in the mounted position, engages a fork at the free end of the bail 23 and is tightened by the wing nut 25. The substantially semi-circular projection 34 faces into the slot 6 and forms the shoulder 28.

The centering pin 10 is located to point substantially radially inwardly. The arm 8 is rigidly secured to or forms an integral part of the section 7. The adjustment drive means 9 for angularly positioning the flap 4 is secured to the free end of the arm 8 by means of the plate 26. Electrical connecting wires extend out of the housing for the drive 9.

Although the invention has been described with reference to specific example embodiments, it is to be understood, that it is intended to cover all modifications and equivalents within the scope of the appended claims.

What is claimed is:

1. A throttling apparatus for a conduit, comprising a pipe section connectable to said conduit, flap means in said pipe section, adjustment means operatively connected to said flap means, said pipe section comprising a substantially radially extending slot and for inserting said flap means through said slot, ring section means operatively arranged to cover said slot, bearing means in said ring section means for supporting said flap means in said ring section means, and securing means operatively securing said ring section means to said pipe section for removing said flap means through said slot when the flap means is in a pipe closed position to provide access to said pipe section, said securing means comprising bail means, pivoting means connecting said bail means to one end of said ring section means, releasable means connecting said bail means to the other end of said ring section means, said bail means bridging said pipe section substantially opposite said slot.

2. The throttling apparatus of claim 1, wherein said securing means permit moving said flap means in its closing position out of the pipe section.

3. The throttling apparatus of claim 1, wherein said securing means permit tilting said flap means out of the pipe section.

4. The throttling apparatus of claim 1, further comprising connecting means rigidly connecting said adjustment means to said ring section means and thus to said flap means.

5. The throttling apparatus of claim 1, further comprising arm means rigidly extending substantially radially from said ring section means, said arm means supporting said adjustment means.

6. The throttling apparatus of claim 1, wherein said ring section means comprise on its inner side operatively positioned first stop means, and wherein said pipe section comprises in a zone opposite said slot second stop means, said flap means resting against said first and second stop means in the closed position of the flap means.

7. The throttling apparatus of claim 1, further comprising centering means operatively interposed between said ring section means and said pipe section, said centering means securing the positions of said ring section means and said pipe section relative to each other.

8. The throttling apparatus of claim 1, wherein said securing means comprise hinging means for tiltably securing one end of said ring section means to said pipe section whereby said ring section means is tiltable about an axis extending in parallel to the longitudinal axis of said pipe section.

9. A throttling apparatus for a conduit, comprising a pipe section connectable to said conduit, flap means in said pipe section, adjustment means operatively connected to said flap means, said pipe section comprising a substantially radially extending slot, ring section means operatively arranged to cover said slot and for inserting said flap means through said slot, bearing means in said ring section means for supporting said flap means in said ring section means, and securing means operatively securing said ring section means to said pipe section for removing said flap means through said slot when the flap means is in a pipe closing position to provide access to said pipe section, arm means rigidly extending substantially radially from said ring section means, said arm means supporting said adjustment means, centering means operatively interposed between said ring section means and said pipe section, said centering means defining the positions of said ring section means and said pipe section relative to each other, and wherein said securing means for said ring section means comprise nut means and tension bolt means extending substantially tangentially relative to said ring section means, said pipe section comprising support eye means, said tension bolt means cooperating with said support eye means for holding said ring section means.

10. The throttling apparatus of claim 1 or 9, further comprising sleeve means (20) including tightening means (19) for securing both ends of said pipe section (3) to respective portions of said conduit (2).

* * * * *

UNITED STATES PATENT OFFICE
CERTIFICATE OF CORRECTION

Patent No. 4,332,271           Dated June 1, 1982

Inventor(s) Eduard Rohr

It is certified that error appears in the above-identified patent and that said Letters Patent are hereby corrected as shown below:

On The Title Page Item (73) should read
-- [73] Assignee: Firma Wibe-Treuhand AG
                  Feldeggstrasse 468
                  CH-5614 Sarmenstorf
                  SWITZERLAND--.

In the Claims:

Claim 1, line 5, delete "and".

Claim 9, line 5, after "slot" insert --for inserting said flap means through said slot--;

line 6, after "slot" delete "and for";

line 7, delete "inserting said flap means through said slot".

Signed and Sealed this

Seventeenth Day of August 1982

[SEAL]

Attest:

Attesting Officer

GERALD J. MOSSINGHOFF

Commissioner of Patents and Trademarks